United States Patent
Lu et al.

(10) Patent No.: US 6,785,241 B1
(45) Date of Patent: Aug. 31, 2004

(54) METHOD FOR PACING BUFFERED DATA TRANSFERS OVER A NETWORK SUCH AS FIBRE CHANNEL

(75) Inventors: Tan Lu, Poughkeepsie, NY (US); Daniel F. Casper, Poughkeepsie, NY (US); David F. Craddock, New Paltz, NY (US); Robert J. Dugan, Hyde Park, NY (US); Giles R. Frazier, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/452,992

(22) Filed: Dec. 2, 1999

(51) Int. Cl.$^7$ ................................................. H04L 12/56
(52) U.S. Cl. .................................... 370/241; 370/412
(58) Field of Search .............................. 370/229, 235, 370/236, 241, 252, 253, 389, 412, 413, 414, 415, 416, 417

(56) References Cited

U.S. PATENT DOCUMENTS

| | | | | |
|---|---|---|---|---|
| 5,483,526 A | * | 1/1996 | Ben-Nun et al. | 370/395.7 |
| 5,748,613 A | * | 5/1998 | Kilk et al. | 370/231 |
| 5,825,748 A | * | 10/1998 | Barkey et al. | 370/236 |
| 6,044,406 A | * | 3/2000 | Barkey et al. | 709/235 |

* cited by examiner

*Primary Examiner*—Huy D. Vu
*Assistant Examiner*—Daniel Ryman
(74) *Attorney, Agent, or Firm*—John E. Campbell; Floyd A. Gonzalez; Lily Neff

(57) ABSTRACT

The present invention provides a method for managing transmissions to a remote node having a buffer memory for receiving the transmitted packets and means for acknowledging the receipt of the packets. The method provides for a sender to maintain a sense of the availability of buffer memory even when acknowledging messages are lost with minimal impact on performance.

19 Claims, 4 Drawing Sheets

Example for Alternative 3: 1 R_RDY is lost
and 1 SOFA is lost

Figure 3  Example for Alternative 2: Assume 1 R_RDYA is lost

Example for Alternative 3: 1 R_RDY is lost and 1 SOFA is lost

METHOD FOR PACING BUFFERED DATA TRANSFERS OVER A NETWORK SUCH AS FIBRE CHANNEL

FIELD OF INVENTION

This invention generally relates to the field of digital data transmission. More specifically a mechanism in which a sender node transmits a plurality of data units and a receiver node buffers the data units, transmitting an acknowledgment for each unit.

BACKGROUND OF THE INVENTION

In computer systems, it is often necessary to transmit data from one node to another. An example of such transmission is Fibre Channel nodes. Transmission of information proceeds in units where the units are packets of information and may include architecture specific information such as headers, CRC fields, source or destination identifiers and the like. Packets are data associated together to form a single unit for transmission. A bus may be a point to point fiber-optic serial bus. The bus in an obvious alternative to this embodiment could also include switches and repeaters as are known in the art as in fibre channel fabrics. Packets are often transmitted over a unidirectional bus. Packets are also often received over a second unidirectional bus. In one example implementation, such a pair of unidirectional serial buses might be utilized to transmit data packets from a first node to a second node, while receiving acknowledgments from the second node at the first node.

To increase the speed of communication, sending (transmitting) nodes often do not require the acknowledgment of the fact that one packet has been processed by the receiver before sending out the next packet. In such a design, many packets can be sent before the first is acknowledged. Sending out multiple unacknowledged packets in this fashion, is made possible by allowing the receiver to buffer received packets that have not yet been processed. The maximum number of packet buffers available for the receiver to use is the maximum available receiver credit.

To illustrate for example, during transmission of packets, the available receiver credit is maintained in a counter as viewed by the sender. The count is decremented when a packet is sent and incremented when a packed is received. It will be understood that it doesn't really matter whether the count is incremented or decremented because the ability to transfer packets can still be inferred from the count. As the receiver completes the processing of each buffered packet, an acknowledgement is transmitted via the bus to the sender. When the acknowledgement is recognized by the sender, the available receiver credit is incremented. If however, the sender erroneously misses an acknowledgment for a packet it has sent to the receiver, the available receiver credit, as viewed by the sender, will remain at the decremented value. The receiver might miss an acknowledgment for a number of reasons. For example: (1) because of a link transmission error, the receiver never recognized the original packet, or (2) the packet was successfully received; however, the acknowledgement was never recognized by the sender because of a transmission error. At this point, one receiver credit is permanently lost. If the link condition persists, further buffer credits likewise can be lost leading to serious performance degradation. In theory, this process could continue until all receiver credit is lost terminating the transmission of packets.

Methods are known to solve the problem. One such method is the use of packet sequence numbers. In this solution, each packet is assigned a sequence number from a contiguous set and it can be used as a means for distinguishing it from other unacknowledged packets. Thus the loss of acknowledgments can be detected from a discontinuity in the sequence number. One challenge in implementing the sequence number is the additional complexity in maintaining the sequence numbers at the nodes involving potentially several thousands of different operations. An example of the additional complexity is the amount of logic needed to correctly distinguish if the discontinuity is caused by the allowed out of order packet processing or because of an actual receiver credit loss. Another solution, usually used in an arbitrated environment, is to only allow a node to send packets during certain time-slots. At the beginning of the time-slot, the arbitrating entity assures that the available receiver credit as viewed by the sender is correct. One challenge with this solution is that due to latency issues and also possible demands on the arbitrating entity, the topology and the number of nodes in the network is limited. Moreover, the transmission at a node is disrupted, in the sense that there will be long periods of time during which the node can not transmit anything.

SUMMARY OF THE INVENTION

The foregoing shortcomings of the prior art are addressed and further advantageous features provided by the present invention which entails the use of alternating commands in predefined periods of packet transmission.

It is therefore an object of the present invention to manage transmission to a remote buffer such that the buffer is fully utilized by maintaining a sense of the availability of buffer space even when responses (acknowledgment) signals are not received by the sender.

It is another object of the invention to maintain a count at a sending node indicative of the availability of a remote buffer specification and correct the count when responses are lost.

It is yet another object of the invention to count the number of packets sent using one packet type and compare the count with the corresponding number of acknowledgments of one type received during a pre-specified time period.

It is still another object of the invention to count the number of packets sent using one packet type and compare the count with the corresponding number of acknowledgments of one type received for a pre-specified number of concurrent transmissions.

It is further, an object of the invention to sense the beginning and end of a group of packets sent by sending a first group with a first packet type and a second group with a second packet type wherein the receiver detects the transition from one type to another as a group boundary.

It is yet a further object of the invention to sense the beginning and end of a group of acknowledgments sent by sending a first group with a first acknowledgment type and a second group with a second acknowledgment type wherein the receiver detects the transition from one type to another as a group boundary.

These and other objects of the invention are provided by a transmitting node architecture that allows for the sender and the receiver to periodically synchronize with each other, and reclaim any lost buffer credits by means of a nondisruptive method.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE PREFERRED EMBODIMENT OF THE INVENTION

This invention provides a method to recover lost receiver credits in a data transmission protocol involving a buffered reception system. The embodiments are demonstrated using Fibre Channel as an example. It should be understood by those versed in the art that the teaching of this invention is applicable over a wide variety of bus protocols and the invention is not restricted to Fibre Channel.

In this specification, the terms: "packet", "unit", and "frame" may be used interchangeably. A "transmission" may refer to a packet sent or an acknowledgment sent. "Counters" are illustrative entities and the same function can be provided by other means and still be consistent with the method taught in the invention. "Nodes", "senders" and "receivers" are terms used to provide a clear generic explanation of the invention. The transmission media is illustrated as fibre channel serial fibre but the invention can be applied to a wide variety of bus architectures and data transmission media including serial, parallel, bi-directional, unidirectional, wire, optical or wireless. In the disclosure, packets sent are specially marked in order to differentiate them.

The special marking (packet type) is illustrated as a packet delimiter but any method consistent with a bus architecture can be used to accomplish the special marking. Some examples are: unique signals, unique commands, unique packet headers, unique packet footers, unique field encoding in the packet, unique tags and numerous others known in the art. Similarly, special marking for acknowledgment type can be accomplished by numerous methods known in the art.

An optional means is provided to permit the receiving node to cause the sending node (that is keeping track of the number of outstanding transmissions) to reset it's counter. The receiving node can in one example, send a greater than expected number of acknowledgments causing the sending node to indicate that all outstanding transmissions of the type have been completed. A variation on this is achieved by use of a special reset acknowledge type indicating that the sender should adjust it's count as if all transmissions of the type have been completed.

In one embodiment, a transmitting node architecture is disclosed that enables the sender and the receiver to periodically synchronize with each other, and reclaim any lost buffer credits by means of a nondisruptive method. (A buffer credit is a term that indicates how many transmissions can be outstanding at a time).

Figure 2:
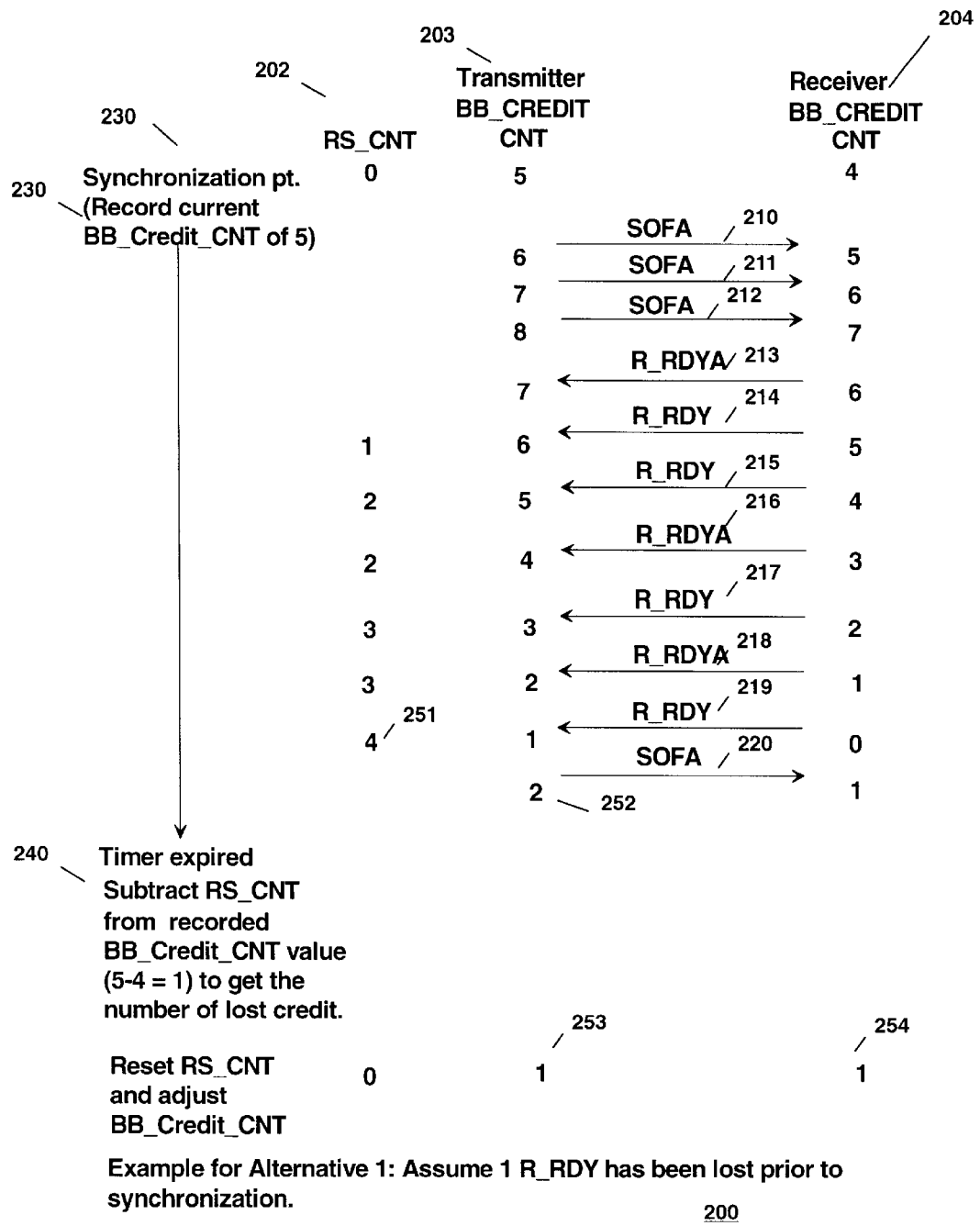
FIG. 2 depicts an example communication sequence for a first embodiment.

Referring to FIG. 2, when the sender decides that a buffer credit re-synchronization should take place, it signals the receiver of the specific event of the beginning of the re-synchronization process. This signaling can be achieved by specially marking the packets. At the beginning of the re-synchronization period, the sender records the number of outstanding acknowledgments that it is expecting. It also resets a counter, called the re-synchronization counter (RS_CNT) to zero. This counter will be used to keep track of the number of acknowledgments for those currently unacknowledged packets transmitted by the sender before the re-synchronization period began. During the re-synchronization period all frames transmitted by the sender will be specially marked. When those marked frames are processed by the receiver, special acknowledgments are transmitted back to the sender. The special acknowledgments, when received by the sender affect the running receiver credit just like a regular acknowledgment; however, they have no affect on the RS_CNT which is only incremented by 1 for each regular acknowledgment the sender receives. The re-synchronization period should be long enough so that at the end of the period, it is certain that any packet sent before the period began is either lost or has been processed. At the end of the re-synchronization period, the RS_CNT is the number of regular acknowledgments that were actually received by the sender for those packets sent before the beginning of the re-synchronization period. Since the number of regular acknowledgments the sender was expecting, was recorded at the beginning of the re-synchronization period, the difference between the RS_CNT and this recorded value is the number of buffer credits lost. To prevent errant cases, before the RS_CNT is used, the RS_CNT should be checked to see if it is smaller than the maximum available receiver credit value. If RS_CNT is greater than the maximum available receiver credit value, the recovery process is deemed in error, and therefore should be terminated. This check may also be used by a receiver that can check its buffers to determine if any unmarked packets are still present. If any unmarked packets are still present, the receiver can send out regular acknowledgments greater than the maximum available receiver credit value. This will cause the RS_CNT to be greater than the maximum available receiver credit value, and terminate the recovery process. Alternately, the receiver can send a special reset acknowledgment type. Thus the possibility of overflowing the receiver buffer is prevented. Since this solution does not require any extra bits to be transmitted, the scheme can run as often as needed. In one preferred embodiment, the scheme will be run every 256 re-synchronization periods.

Figure 1:
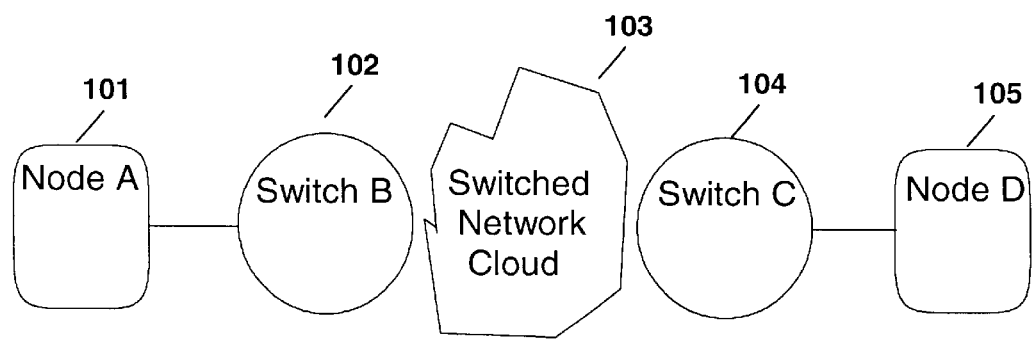
FIG. 1 depicts components of an example fibre channel network.

An example of an environment in which this invention can be used is the Fibre Channel. In this environment two nodes may communicate with each other directly or over a switched network (as illustrated in FIG. 1). When node-A 101 sends information to node-D 105 through fabric 103, the switches 102,104 used enroute perform a store and forward function using acknowledgments without any sequence number attached. For example, when a packet is sent by node-A 101, it is received by switch node-B 102 and stored in B's buffer until node-B can forward the packet to the next node (a switch-C enroute) 104. When B 102 sends it to switch-C 104, the packet is cleared from B's buffer and an acknowledgment is sent back to node-A 101. When node-A 101 receives this acknowledgment, it's receiver credit is increased by one. However, if node-A 101 never receive this acknowledgment, one receiver credit is lost. Such lost receiver credits will be recovered periodically by invoking the following mechanism.

Currently Fibre Channel sends link level packets called frames between two directly connected nodes. Each frame is delimited by a special character, Start Of Frame (SOF) delimiter, to signal the receiver the beginning of each frame. When a frame is processed and the corresponding buffer freed, the receiver sends back an acknowledgment in the form of a special character, the R_RDY character. Two new special characters are defined in this invention to be used in place of the normal SOF delimiter and the R_RDY character during a re-synchronization period in this embodiment. These two special characters will be referred to as the SOFA and R_RDYA. Actually there are a plurality of SOF characters defined in the present Fibre Channel standard. They are used to distinguish between the different classes of data traffic that exists in the Fibre Channel standard. Therefore, multiple SOF's are defined. When the receiver clears a buffer containing a frame originally delimited with the SOF delimiter, an R_RDY is sent to the sender, and if the frame was delimited by SOFA an R_RDYA is sent. RS_CNT operates as previously described. The SOFA and R_DYA signals are used to specially mark the packets sent during the re-synchronization period.

FIG. 2 shows an example sequence to demonstrate the operation of this embodiment. In Fibre Channel, the sender uses a counter, BB_CREDIT_CNT 203, to manage receiver credits. BB_CREDIT_CNT 203 represents the number of frames for which the sender has not yet received acknowledgments. In other words, BB_CREDIT_CNT 203 is the number of buffers (and transmissions in flight) the sender believes to be occupied on the bus and at the receiver. The maximum allowed value is the total number of buffers the receiver has and is pre-assigned or determined when communication is first established. As long as BB_CREDIT_CNT 203 is smaller than the maximum allowed value, the sender can send out new frames. For each frame sent, BB_CREDIT_CNT 203 is incremented by one, and for each R_RDY received, the BB_CREDIT_CNT 203 is decremented by one.

At a predetermined time a re-synchronization event is initiated. At the beginning of a re-synchronization period, the value of BB_CREDIT_CNT 230 is recorded. This is the number of acknowledgments the sender should eventually receive for the packets that were sent before the start of the re-synchronization period. At this time RS_CNT 202 is reset to zero. To ensure correct operation, recording the value of BB_CREDIT_CNT 203 and the resetting of RS_CNT 202 must be synchronized relative to sending frames and receiving acknowledgments. Starting at this point, during the re-synchronization period, all packets sent out will use the special delimiter, SOFA 210, 211, 212. The receiver will respond with an R_RDYA after it processes a frame with the SOFA delimiter. A re-synchronization time period (FIG. 2, 230 to 240) is defined to provide enough time for the sender to have received acknowledgments from any outstanding frame transmissions sent prior to the re-synchronization time period. This re-synchronization time period is referred to as the Resource Available Interval (RAI). During the re-synchronization period, for each R_RDY 214, 215, 217, 219 received RS_CNT 202 is incremented by one, and RS_CNT 202 is unchanged if a R_RDYA 213, 216, 218 is received. For each acknowledgment received, either a R_RDY or a R_RDYA, transmitter BB_CREDIT_CNT 203 is decremented by one. At the end of the re-synchronization period, since enough time has elapsed, the bus and receiver buffer are "flushed" of pre-synchronization transmissions. That is, all frames sent before the beginning of the RIA period are no longer occupying a receiver buffer and the RS_CNT 202 (the actual number of acknowledgments received) should be equal to the recorded value of BB_CREDIT_CNT 230 (the expected number of acknowledgments). If the two values are not equal, their difference is the number of receiver credits lost, and BB_CREDIT_CNT 203 can be adjusted accordingly.

In the example in FIG. 2 prior to the start of the re-synchronization period, four frames are in the receiver buffer. However, one receiver credit was lost, therefore the sender has a BB_CREDIT_CNT 203 value of five. At the beginning of the period, the number five is recorded 230, and RS_CNT 202 is reset to zero. During the re-synchronization period four R_RDY's 214, 215, 217, 219 are received accounting for the four frames that were already in a receiver buffer before the start of the re-synchronization period. The RS_CNT 251 is thus four at the end of the period. Since RS_CNT 251 is one less than the recorded value of five, the sender can conclude that one receiver credit was lost. Also during this period, four frames were sent (delimited by SOFA). For those frames, three R_RDYA's were received, for a total of seven acknowledgments. Thus, BB_CREDIT_CNT 252 is 2 at the end of the re-synchronization period. At this point the sender can lower BB_CREDIT_CNT 252 by one, to account for the lost receiver credit, making a BB_CREDIT-CNT 253 value of 1, which is the correct value 254.

To prevent errant cases, before the RS_CNT 202 is used, it should be checked to see if it is smaller than the maximum available receiver credit value. Since this solution does not require any extra bits to be transmitted, the scheme can run frequently. It should be noted that there are variations of this embodiment that would be obvious in light of the teaching of this invention. As an example, the sender could send one SOFA to signal the receiver to send a predetermined number of R_RDYA's.

In another embodiment, the sender and receiver periodically synchronize with each other, and reclaim any lost buffer credits in a non disruptive manner. To accomplish this, an interval of time is specified and it is of sufficient duration to insure all packets having been transmitted to the receiver before the interval started have been processed and no longer reside in the receiver's buffer. The time interval will be called the Resource Available Interval (RAI). Two types of packets are defined for usage by the sender—type A and type B. Also for each type of packet transmitted by the sender, a unique acknowledgment is signaled by the receiver. For this invention, the receiver when having received a type A packet, transmits to the sender a type A acknowledgment, and having received a type B packet transmits an acknowledgment to the sender using a type B acknowledgment. The sender will alternate between using the two types of packets every RAI (alternating every RAI is used in this preferred embodiment; however, any period greater than RAI can also be used.) Whenever the sender switches from one type of packet to the other type, a counter, T_CNT, is reset to 0 and is used to keep track of the number of unacknowledged packets transmitted by the sender during that RAI. If, for example, type B packets are currently used, the value of the T_CNT should reflect the correct number of type B packets the sender believes to be buffered at the receiver assuming no losses occurred, and vice versa. After one RAI has elapsed and if the sender had been transmitting type B packets, it can be assumed all previously transmitted type A packets have been processed out of the receiver buffer and at this time the receiver credit is set according to the T_CNT (maximum receiver credit value minus T_CNT.) If at the end of an RAI, the T_CNT is incorrect because receiver credit was lost as a result of lost acknowledgments during the interval, this credit will be recovered one RAI later.

This scheme should be run continuously with a set period between transitions longer than one RAI period.

The Fibre Channel implementation of this method (FIG. 3) uses the same new special characters as described in the first embodiment. However, instead of making SOFA and R_RDYA special, and only using them during the re-synchronization period. The notion of re-synchronization period is eliminated. RS_CNT 202 is replaced by the T_CNT 302. The sender will alternate between using SOF's and SOFA's every RAI. When the sender switch from SOF to SOFA or vice versa, T_CNT 302 will be reset to zero. The T_CNT 302 is incremented by one for each frame sent. For each acknowledgment received, if it is the same type as the delimiter used during the current interval, T_CNT 302 is decremented by one, otherwise T_CNT 302 does not change. Therefore T_CNT 302 represents the number of acknowledgments of the current type the sender is expecting. For example, if the SOFA delimiter is currently being used, then T_CNT 302 is actually the BB_CREDIT_CNT 203 for the frames with SOFA delimiters sent during the current period. After one RAI time period has elapsed, and just before a change of delimiter is made, it can be assumed all previously transmitted frames with the other delimiter have been cleared from the receiver buffer, and therefore the value of the T_CNT 302 should reflect the correct BB_CREDIT_CNT 203 assuming no losses occurred. If at the end of an RAI, the T_CNT 302 is incorrect because receiver credit was lost because of lost acknowledgments during the current interval, this credit will be recovered in the next RAI. In other words, during the period when one type of delimiter is being used, the receiver credit lost during the previous period is recovered. This scheme should be run continuously with a set period between transitions longer than two RAI time periods.

Figure 3:
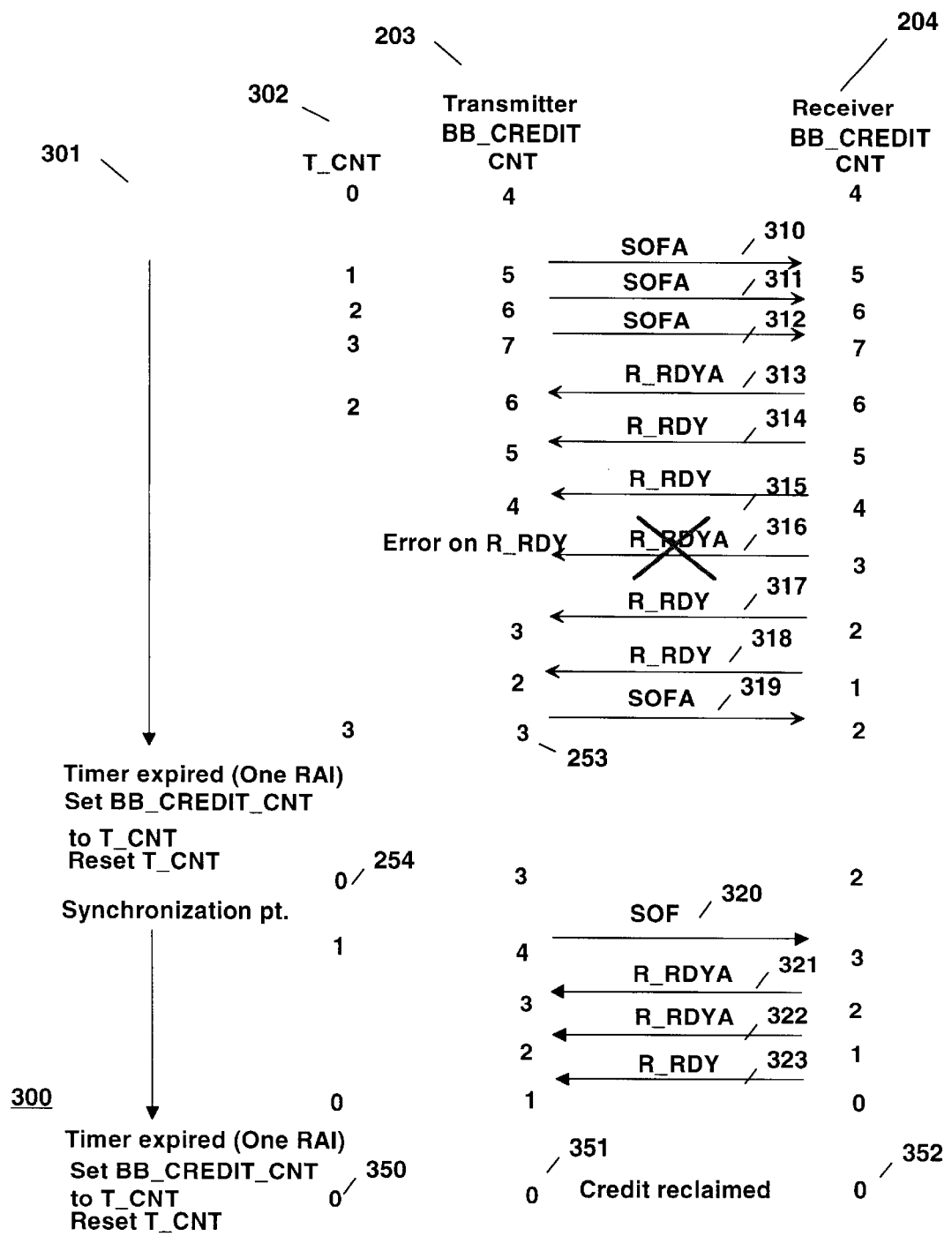
FIG. 3 depicts an example communication sequence for a second embodiment.

FIG. 3 shows an example of the above scheme at work. In this example one R_RDYA 316 is lost, leading to one lost receiver credit. During the current RAI, four frames are sent 310, 311, 312, 319 and only one R_RDYA 313 is received, and all previous frames have been acknowledged. Therefore the BB_CREDIT_CNT 253 is equal to 3 at the end of the first RAI. One Receiver credit is lost at this point. T_CNT 254 is reset to zero. The sender now begins to use SOF's 320. Only one frame is sent during this period, and that frame is acknowledged by R_RDY 323. At the end of the second RAI, since all frames sent during the previous RAI with SOFA delimiter have had time to have been acknowledged and cleared from the receiver buffer, the T_CNT 350 of zero correctly indicates that no frames are currently occupying the receiver buffer. Thus we set BB_CREDIT_CNT 351 to equal to T_CNT 350, making it zero (the correct value), thereby reclaiming the lost credit. Although in this embodiment we have described a method whereby the sender alternates between the two delimiters every RAI, any period longer than RAI can be used and still employ the spirit of the invention. Obviously, more than two delimiters could be employed as well.

In yet a further embodiment, the sender and receiver periodically synchronize with each other and reclaim any lost buffer credits by means of a non disruptive method. Two types of packets and two types of acknowledgments are defined—type A and type B. Preferably, the different types of packets are distinguished by different special characters at the beginning of the packet, and the acknowledgments are differentiated as two different special characters. The sender will alternate between using the two types of packets, A and B, every N packets. The number N can be any arbitrary number big enough so that the probability of losing N consecutive acknowledgments is deemed negligible. This number should be determined when communication is first established between the sender and the receiver. The receiver will alternate between using the two types of acknowledgments, A and B, every N acknowledgments. When a packet is cleared from the receiver buffer, there is no relationship between the packet's type and the type of acknowledgment used. Both the sender and the receiver will keep two counters. The Sender Packet Counter (SP_CNT), is used to keep track of the number of the current type of packets sent. When this number reaches N, the packet type is switched, and SP_CNT is reset to 0. Another sender counter, Sender Acknowledgment Counter (SA_CNT), will be used to keep track of the number of acknowledgments of the current type received. If the sender detects a transition in the acknowledgment type used before SA_CNT reaches N, then the number of credits lost is N minus SA_CNT. The receiver credit is corrected accordingly, and SA_CNT is then reset to zero. SA_CNT is also reset to zero after its value reaches N. The receiver also keeps two counters. One for keeping track of the current type of packets received (RP_CNT), and the other for keeping track of the number of acknowledgments of the current type sent (RA_CNT). When RA_CNT reaches N, the acknowledgment type is switched, and RA_CNT is reset to zero. If the receiver detects a transition from one packet type to another before RP_CNT reaches N, then the number of packets lost for which the receiver owes acknowledgments is N minus RP_CNT. In this case, the receiver can either generate N minus RP_CNT number of extra acknowledgments, or it can make the transition to use the other type of acknowledgment, N minus RP_CNT number of acknowledgments earlier. This method should run continuously.

In this embodiment (FIG. 4) we take advantage of guaranteed, 'in order', delivery of transmissions to avoid the timer required for RAI, for example in a Fibre Channel point to point connection between Node-A 101 and Switch node-B 102 (see FIG. 1). In this method, SOFA 410,411,412 and R_RDYA 417,419,423,424 are invented as before. The sender will alternate between using SOF 421 and SOFA, every N packets 430. The number N is the maximum receiver credit which is pre-assigned or can be assigned when communication is first established. The receiver will alternate between using R_RDY and R_RDYA, every N acknowledgments. When a frame is cleared from the receiver buffer, there is no relationship between the frame's delimiter and the type of acknowledgment used. Both the sender and the receiver will keep two counters, as described above. The Sender Packet Counter (SP_CNT) 407, is used to keep track of the number of frames sent using the current delimiter. When this number reaches N the other delimiter is used, and SP_CNT 407 is reset to zero. A Sender Acknowledgment Counter (SA_CNT 402), will be used to keep track of the number of acknowledgments of the current type received. If the sender detects a change in the acknowledgment type used before SA_CNT 402 reaches N, then the number of credits lost is N minus SA_CNT 402. As described above, RP_CNT 405 keeps track of frames received with the current delimiter, RA_CNT 406 keeps track of the number of acknowledgments of the current type sent. When RA_CNT 406 reaches N, the acknowledgment type is switched, and RA_CNT 406 is reset to zero. If the receiver detects a change in the frame delimiter used before RP_CNT 405 reaches N, then the number of frames lost for which the receiver owes acknowledgments is N minus RP_CNT 405. In this case, the receiver generates N minus RP_CNT the 405 number of extra acknowledgments. This method should run continuously.

Figure 4:
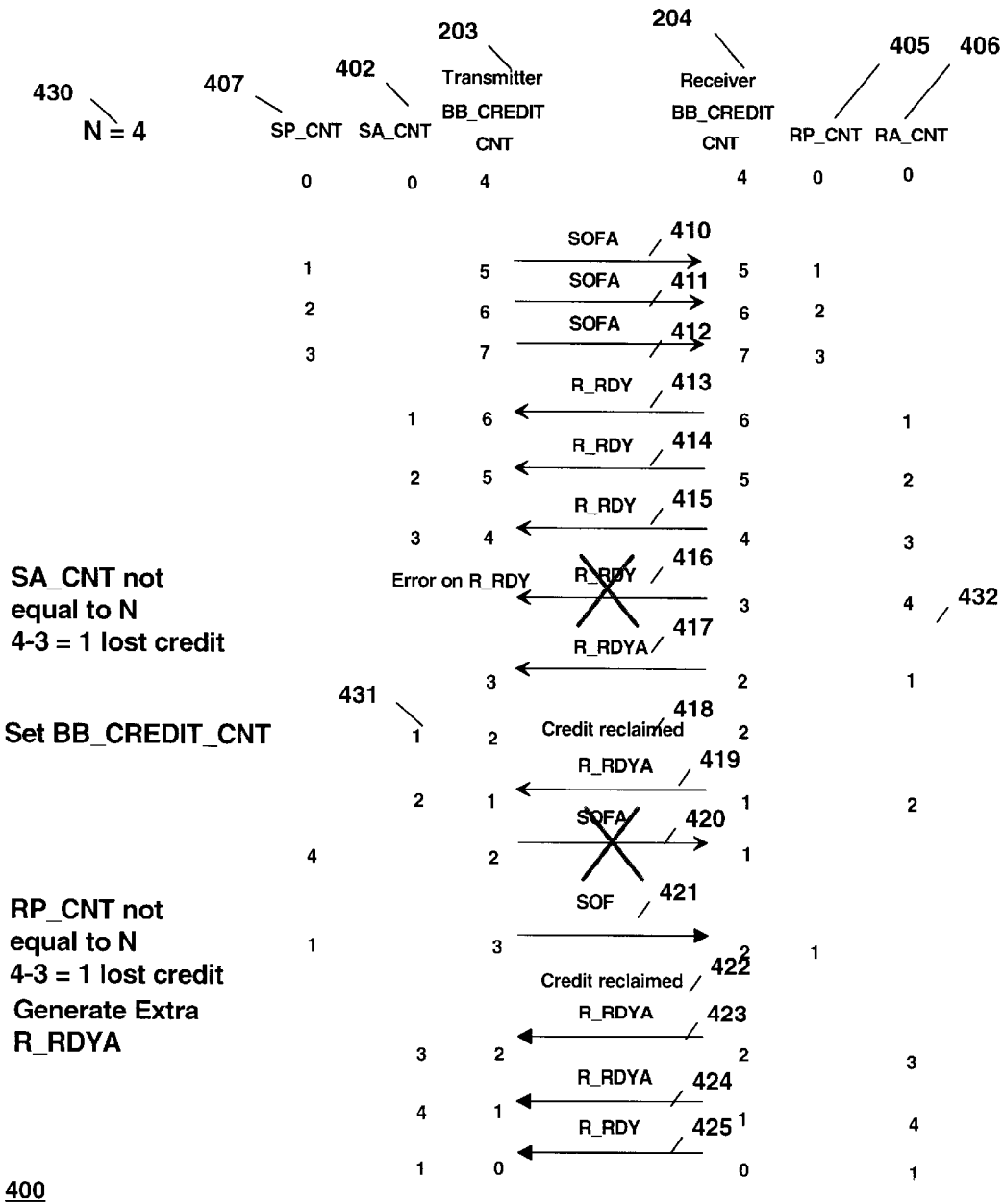
FIG. 4 depicts an example communication sequence for a third embodiment.

FIG. 4 shows this method in operation. To simplify this example, N is set to four, even though the maximum receiver credit is larger. The initial condition has four receiver buffers occupied and no lost credits, therefore the BB_CREDIT_CNT 204 is equal to four. The sender sends out three frames delimited by SOFA 410, 411, 412, and for each frame SP_CNT 407 is incremented by one. All three frames are received, and for each received frame, RP_CNT 405 is incremented by one. Both SP_CNT 407 and RP_CNT 405 are set to three at this point. Then the receiver sends out four R_RDY's 413, 414, 415, 416, however one was lost 416. For each R_RDY sent out, RA_CNT 406 is incremented by 1. Therefore RA_CNT 406 equals four at this point, indicating to the receiver that the next acknowledgment sent out should be a R_RDYA 417. The sender only received three R-RDY's, and for each R_RDY received, SA_CNT 402 is incremented by one. Therefore the SA_CNT 402 is only three at this point. The receiver then sends out two R_RDYA's 417, 419. RA_CNT 406 is reset to zero just before the first R_RDYA is sent. After sending the two R_RDYA's, RA_CNT 406 has incremented to two. When the first R_RDYA 417 reaches the sender, the sender detects a change from R_RDY to R_RDYA while SA_CNT 402 is not equal to N (four). Therefore, the sender logic concludes that N minus SA_CNT 402 number of acknowledgments have been lost, and asserts an exception indication. Consequently, BB_CREDIT_CNT 203 is decremented by one; thus correctly recovering the lost credit. The SA_CNT 402 is then set to one 431 accounting for the first R_RDYA 417 received, and it's incremented by one for each additional R_RDYA 419 that follows. After this point 419, the sender sends out another frame with SOFA 120 delimiter. This frame was lost. After the frame was sent out, SP_CNT 407 equals four, indicating to the sender that the next frame should use SOF 421 delimiter. Since the frame is lost, RP_CNT 405 remains at three. When the next frame with the SOF 421 delimiter is received, the receiver concludes that since there is a change in the delimiter used while RP_CNT 405 is one less than N, one frame was lost, and a second exception is asserted. Therefore, the receiver generates an extra R_RDY 425 to lower the sender's BB_CREDIT_CNT 203 by one.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for maintaining a first count at a first node indicating the ability of a data transmission system to accept additional packet transmission, said data transmission system including the first node and a second node, said method comprising the steps of:
   a) sending from the first node a plurality of normal packets during a normal period;
   b) receiving at said first node a plurality of normal acknowledgments responsive to said normal packets;
   c) sending from said first node a plurality of special packets during a resynchronization period, said resynchronization period beginning when sending said special packets and ending when a plurality of special acknowledgments have been received;
   d) receiving a said plurality of special acknowledgments responsive to said special packet;
   e) detecting at said first node at the end of said re-synchronization period, if at least one normal acknowledgment has not been received; and,
   f) after the detecting if the at least one normal acknowledgment has not been received, modifying said first count to correct for packet loss.

2. A method for maintaining a first count at a first node indicating the ability of a data transmission system to accept additional packet transmission, said system having a first node for sending a set of first packets and a set of second packets to a second node and receiving a set of first acknowledgments and a set of second acknowledgments from said second node, the method comprising the steps of:
   a) sending from said first node a first plurality of packets consisting of a first packet;
   b) storing at said first node a first counter value as an initial first count at the beginning of a re-synchronization period, the re-synchronization period comprising a period of time during which said second packets are sent and said second acknowledgments are received;
   c) sending from said first node a second plurality of packets consisting of a second packet type;
   d) receiving at said first node a third plurality of acknowledgments consisting of a first acknowledgment type;
   e) receiving at said first node a fourth plurality of acknowledgments consisting of a second acknowledgment type said second acknowledgment type being sent in response to a second packet type received by said second node;
   f) updating said first counter value when said packets are sent and when said acknowledgments are received; and,
   g) correcting said first counter value when a packet or acknowledgment transmission is lost.

3. A method according to claim 2 wherein one of said pluralities is demarcated by a change in acknowledgment from first acknowledgment to second acknowledgment or from second acknowledgment to first acknowledgment.

4. A method according to claim 2 further including the step of counting at said second node said third plurality of acknowledgements sent during said re-synchronization period.

5. A method according to claim 2 wherein the updating step increments said first count when a packet is sent and decrements said first count when an acknowledgement is received.

6. A method during a re-synchronization time for maintaining at a sending node a predetermined value and a first counter containing a first count, wherein said first count is incremented with each type of packet sent and decremented with each type of acknowledge received, a first type of acknowledge being a response to a first type of packet sent and a second type of acknowledge being a response to a second type of packet sent, said method comprising the steps of:
   a) storing at said sending node said first count to a first memory location when said re-synchronization time is begun;
   b) initializing at said sending node a second counter to zero when said re-synchronization time is begun;
   c) sending at said sending node a plurality of said second packet types requiring said second acknowledge types during said re-synchronization time;
   d) incrementing at said sending node said second counter each time said first type of acknowledge is received during said re-synchronization time; and
   e) decrementing at said sending node said first counter by a value that is the difference in value between said second counter and said first memory location count when said re-synchronization time ends, when said second counter is less than said predetermined value.

7. A method according to claim 6, further comprising the step of initializing said first count value to zero before a first packet is transmitted.

8. A method according to claim 6, further comprising the step of transmitting at said receiving node extra acknowledgments to account for any missing acknowledge types.

9. A method according to claim 6, further comprising the step of transmitting from said receiving node a special reset acknowledge type to account for any missing acknowledge types.

10. A method for maintaining a first count at a first node relating to the ability of a data transmission system to accept additional packet transmission, said system including the first node and a second node, said method comprising the steps of:
 a) transmitting at said first node a plurality of first packets during a first time period;
 b) maintaining a second count at said first node, said second count indicating a number of first acknowledgements types that have not been received;
 c) correcting at said first node said first count based on said second count at termination of said first time period; and
 d) resetting said second count.

11. A method for maintaining at a sending node a first counter containing a first count indicating any number of memory slots for packets that are busy at a second node; said first count being incremented with each type of packet sent and decremented with each type of acknowledge received, said method comprising the steps of:
 a) resetting at said sending node a second counter to an initial value when a first time interval begins;
 b) sending from said sending node a first packet type requiring a first acknowledge type response during a first time interval;
 c) receiving at said sending node a first acknowledge type at said sending node;
 d) incrementing at said sending node said second counter after a first packet type is sent;
 e) decrementing at said sending node said second counter after said first acknowledge type is received, during said first time interval;
 f) setting at said sending node said first counter to the value of said second counter after said first time period ends.

12. A method according to claim 11, wherein said first time interval is equal to or greater than a fibre channel resource available interval.

13. A method for maintaining a predetermined number and a first count in a first counter at a first node having said first counter and a second counter, the first count relating to capacity of a data transmission system to accept additional packet transmissions, said system including a first node and a second node, said method comprising the steps of:
 a) counting at said first node in a said second counter a plurality of acknowledgments of a first acknowledge type received;
 b) detecting at said first node an acknowledgment of a second acknowledge type after the receipt of said first acknowledge type;
 c) responsive to the detecting step, comparing at said first node said second counter of said acknowledgments of a first acknowledge type received with a predetermined number; and,
 d) modifying at said first node said first count in said first counter if said second counter contains a value that is less than said predetermined number.

14. A method at a sending first node having a first pre-determined number, for maintaining a first counter containing a first count indicating number of transmitted units that have not been acknowledged at a receiving second node; said first count being incremented with each type of packet sent and decremented with each type of acknowledge received, said method comprising the steps of:
 sending from said first node to a second node said first predetermined number of first packet types, incrementing a second counter at said first node each time said first packet type is sent;
 receiving at said first node said predetermined number of first acknowledge types when no lost credits are detected at the second node;
 incrementing a third counter at said second node when either type of packet is received;
 asserting a second exception at said second node when the count at said third counter is not equal to said first predetermined number when a new packet type is detected;
 incrementing a fourth counter at said first node when a first or second acknowledge type is received at said first node;
 incrementing a fifth counter at said second node when a first or second acknowledge type is sent;
 asserting aft first exception indication at said first node when the count at said fourth counter is not equal to said predetermined value after a new acknowledge type is detected at said first node.

15. The method according to claim 14, wherein said first exception indication causes said first counter to be modified.

16. A method according to claim 14, wherein said first exception causes an extra acknowledgment to be sent to said first node.

17. A method according to claim 14, wherein said first exception causes a reset acknowledgment to be sent to said first node.

18. A method according to claim 14, wherein said first exception increments the count of said third counter an extra time.

19. A method according to claim 18, further comprising the steps of:
 a) calculating difference between said pre-determined number and count of said fourth counter;
 b) reducing the value of the count by the result of said calculating step.

* * * * *